United States Patent [19]

Wang

[11] Patent Number: 4,512,894

[45] Date of Patent: Apr. 23, 1985

[54] PROCESS FOR THE PRODUCTION OF SEMIPERMEABLE POLYBENZIMIDAZOLE MEMBRANES AND THE RESULTANT PRODUCT

[75] Inventor: Donald G. J. Wang, Tamshui, Taiwan

[73] Assignee: Celanese Corporation, New York, N.Y.

[21] Appl. No.: 450,719

[22] Filed: Dec. 17, 1982

[51] Int. Cl.$^3$ .............................................. B29D 27/00
[52] U.S. Cl. .................................... 210/500.2; 264/41;
264/205; 264/209.1; 264/235; 264/346; 521/64; 528/342
[58] Field of Search ................. 264/41, 343, 342, 205, 264/235, 346, 209.1; 210/500.2; 521/64, 188; 528/342

[56] References Cited

U.S. PATENT DOCUMENTS

| | | | |
|---|---|---|---|
| 3,699,038 | 10/1972 | Boom | 264/41 |
| 3,851,025 | 11/1971 | Ram | 264/41 |
| 3,920,785 | 11/1975 | Druin | 264/343 |
| 4,448,687 | 5/1984 | Wang | 264/41 X |

*Primary Examiner*—Philip Anderson
*Attorney, Agent, or Firm*—Burns, Doane, Swecker & Mathis

[57] ABSTRACT

A membrane cast in the form of either a hollow filament or a flat film formed of a polybenzimidazole polymer is subjected to an annealing process by contacting the membrane with a non-aqueous annealing medium comprised of a solvent for the polymer and a non-solvent for the polymer. Such an annealing step can advantageously occur at an annealing temperature below about 125° C. (e.g., below 100° C.) These polybenzimidazole membranes find particular utility in reverse osmosis desalination processes. The annealing step of the present invention improves the mechanical and separative properties of the membrane.

55 Claims, No Drawings

PROCESS FOR THE PRODUCTION OF SEMIPERMEABLE POLYBENZIMIDAZOLE MEMBRANES AND THE RESULTANT PRODUCT

CROSS-REFERENCE TO RELATED APPLICATION

This application is related to copending application Ser. No. 450,717, filed Dec. 17, 1982 of Donald G. J. Wang entitled "Process for the Production of Semipermeable Polybenzimidazole Membranes With Low Temperature Annealing" and now U.S. Pat. No. 4,448,687.

BACKGROUND OF THE INVENTION

The present invention is directed to the production of semipermeable polybenzimidazole membranes.

In recent years there has been increasing interest expressed in the development of microporous membranes of a semipermeable nature which are useful in separating the components of a solution. For instance, semipermeable membranes have been investigated as a possible means to demineralize o purify otherwise unusable water and to thereby alleviate the increasing demands for potable water necessitated by rapid population and industrial growth in many parts of the world. Separation techniques which employ such membranes include electrodialysis, ultrafiltration, reverse osmosis, etc.

Electrodialysis separations employ an electrolytic cell having alternating anionic and cationic membranes that collect desalted and concentrated solutions in adjacent compartments. Such technique can be useful to purify liquids by removing ionizable impurities, to concentrate solutions of electrolytes, or to separate electrolytes from non-electrolytes.

As opposed to the charge dependent types of separations, reverse osmosis utilizes pressure to transport materials (which may be either ionic or non-ionic) selectively through a membrane. Ultrafiltration, which is very similar, uses gravity or applied pressure to effect separation using membranes which act as submicronic sieves to retain large molecules and permit the passage of small, ionic, non-ionic forms.

The desalination of saline water (e.g., sea water) through the use of semipermeable membranes is commonly characterized by the use of pressure in excess of osmotic pressure and is therefore termed reverse osmosis. The natural tendency for a solution of a higher concentration separated from a solution of lower concentration by a semipermeable membrane is for the solvent on the side of lower concentration to migrate through the membrane to the solution of higher concentration thereby eventually equilibrating the concentrations of the two solutions. The degree of this natural tendency is measured in terms of osmotic pressure. The process may be reversed by applying a pressure to the side of higher concentration in excess of the osmotic pressure, thereby forcing the pure solvent of the solution of higher concentration through the semipermeable membrane to the side of lower concentration, thereby bringing about a separation. The natural tendency, which is believed to be the result of a difference in free energy resulting from the concentration gradient, is observed to operate at a high thermodynamic efficiency and at ambient temperature.

Semipermeable membranes proposed in the past have been formed from a variety of materials, and are characterized by the ability to permit one component (e.g., ions or molecules) of a solution to pass through the same to the substantial exclusion of other components (e.g., other ions or molecules). Examples of substances heretofore recognized to possess this property include cellophane (i.e., regenerated cellulose), cellulose esters (e.g., cellulose acetate, cellulose butyrate, etc.), animal or protein membranes, polyelectrolyte complexes, ethyl cellulose, cross-linked polyacrylates, etc.

The semipermeable membranes of the prior art are of limited applicability in many separatory processes because of inherent disadvantages relating to their chemical stability, strength, thermal stability, efficiency, length of life, and cost. Generally, the prior art membranes exhibit low thermal stability and therefore cannot be used successfully under conditions wherein the liquid undergoing treatment is at an elevated temperature. This may be a decided disadvantage in situations where the components to be separated only exist in solution at higher temperatures, or when it is economically advantageous to separate components of a solution at elevated temperatures rather than going through the expense of cooling it. Furthermore, some membranes exhibit a decided decrease in efficiency upon an increase in temperature or pressure thereby limiting their range of applicability. Solvent susceptibility may be another factor affecting the applicability of a particular porous membrane to a separation process. Additionally, semipermeable membranes may be inappropriate for a particular application due to low solute rejection values or low flux.

Other factors which render the semipermeable membranes of the prior art of limited usefulness in reverse osmosis separatory processes include their limited strength and chemical resistance and extremely short operating lives at high pressures and temperatures. Low strength properties have generally been manifest in the form of the inability of the prior art films to operate at pressures in excess of about 1,000 p.s.i. or to operate at lower pressures for extended periods of time, especially at temperatures in excess of about 50° C. The use of such high pressures is quite desirable in order to increase the speed of reverse osmosis, particularly the speed at which desalinized water is formed. However, when such high pressures have been employed, operating efficiency (i.e., in reverse osmosis desalinization, the degree of salt removal from saline solutions) has significantly decreased. With the use of pulsating pumps in reverse osmosis separatory operations, the presence of rapid increases and decreases in the pressure applied to the reverse osmosis membrane has caused even greater problems when the use of prior art membranes has been attempted. Furthermore, in general commercial usage it is necessary that membranes be strong enough to withstand shipment, storage and general rough handling. Thus, the continued need to replace the prior art membranes due to mechanical failures has greatly limited their commercial usefulness.

The chemical resistance properties of the prior art separatory membranes have been their greatest shortcoming. Although the separation of solutions comprising only sodium chloride and water presents few chemical resistance problems to the prior art membranes, such pure solutions are rarely found. Many naturally occurring saline solutions contain materials which exhibit a degrading effect on previously known reverse osmosis membranes. For example, cellulose acetate and amide-linked polymers, such as those disclosed in U.S. Pat. No. 3,567,632, are subject to either base or acid catalized hydrolysis even in weakly basic or acidic solutions. Other compounds which may exhibit a degrading effect on the prior art membranes include formic acid, acetone and bisulfite ions.

Finally, many of the prior art semipermeable membranes are limited in their usefulness because of the low temperatures at which separatory operations must occur. Higher temperatures (e.g., those in excess of about 50° C.) have resulted in reduced salt removal efficiency, particularly when extended operating times have been employed.

Representative cellulose acetate membranes which may be utilized in desalination processes are disclosed in U.S. Pat. No. 3,133,132, issued to Loeb et al on May 12, 1964. The Loeb et al patent also discloses a process for preparing semipermeable membranes involving the casting of a cellulose acetate solution containing a pore-producing agent, (i.e., an agent which produces a structure which allows an appreciable rate of passage of fresh water under suitable conditions). It has been found, however, that cellulose acetate membranes described therein must be utilized under relatively mild conditions and may not satisfactorily be utilized at elevated temperatures (i.e., in excess of 70° C. to 80° C.). Upon continuous exposure to salt water such cellulose acetate membranes tend to undergo hydrolysis and become less effective for their intended purpose. Also, such membranes may be damaged by contact with a variety of solvents (e.g., phenol, acetone, methyl-ethyl ketone, sodium hydroxide solutions, mineral acid solutions), or by bacteriological attack. Amide-containing membranes which may be utilized in desalination processes are disclosed in U.S. Pat. No. 3,567,632, issued to Richter et al on May 2, 1971. This patent discloses reverse osmosis desalination membranes prepared from nitrogen-linked aromatic polymers. These membranes, however, still exhibit many of the disadvantages previously noted for prior art semipermeable membranes and are therefore of limited usefulness. Although the Richter et al amide-linked polymer membranes may be operated at somewhat higher temperatures and possess greater strength than, for example, cellulose acetate membranes, the relative increases are still less than are commercially desirable. Generally, the useful life of such membranes at pressures in excess of about 300 to 400 p.s.i. is limited to about one to three months. After this period of operation both salt rejection percentage (in aqueous saline solutions) and desalinated water preparation speed has significantly decreased. Finally, these membranes are of limited chemical resistance, especially in view of their susceptability to aqueous hydrolysis in the presence of bases or acids.

The applicability of a particular membrane to the separation of components from solutions appears to depend on both the physical nature of the semipermeable structure and the particular chemical structure of the membrane. It should be noted here that, in accordance with common usage, the terms microporous and semi-permeable or permeable will be used interchangeably to denote the character or quality of the membrane which is necessary to render the membrane suitable for the use herein intended. More specifically, the membranes described herein are characterized by the fact that they allow one or more components of a solution to pass through them while they prevent the passage of one or more other components. Furthermore, the term membrane will be used to describe membranes whether prepared as a flat film, hollow fiber, or other form.

In an attempt to overcome certain of the above-noted disadvantages of prior art membranes, membranes comprised of polybenzimidazole polymers have been provided. See, for example, commonly-assigned U.S. Pat. Nos. 3,699,038; 3,720,607; 3,737,042; 3,841,492; 3,851,025; and 4,020,142, each herein incorporated by reference. While such membranes possess satisfactory properties, it has been proposed to subject such membranes to an annealing step to further enhance the properties thereof. See, in this regard, above-identified U.S. Pat Nos. 3,699,038; 3,737,042; 3,841,492; and 3,851,025. Those patents disclose the use of annealing temperatures ranging up to about 300° C. However, the use of annealing temperatures which exceed about 125° C. can result in disadvantageous mechanical properties in the resulting membrane such as severe dimensional change, membrane brittleness and cracking, etc. However, it has generally been found that annealing temperatures above 125° C. are necessary to achieve the desired enhancement of separation properties (e.g., salt separation) in the membranes.

It is thus an object of the invention to provide an improved process for the production of semipermeable polybenzimidazole membranes.

It is also an object of the invention to provide a process for the production of polybenzimidazole membranes which exhibit improved mechanical properties.

It is further an object of the invention to provide improved semipermeable polybenzimidazole membranes which may be utilized to separate components of a solution.

It is still further an object of the invention to provide improved semipermeable membranes possessing chemical and thermal stability.

It is still further an object of the present invention to provide a method for the production of polybenzimidazole membranes wherein the membranes may be annealed at desirably low temperatures.

These and other objects as well as the scope, nature and utilization of this invention will be apparent from the following detailed description.

SUMMARY OF THE INVENTION

In accordance with the present invention, there is provided a process for the production of a semipermeable polybenzimidazole membrane wherein a film or hollow filament is formed from a solution of a polybenzimidazole polymer and subsequently subjected to an annealing step at an elevated temperature in the presence of an annealing medium, the improvement comprising conducting said annealing step in the presence of a non-aqueous annealing medium comprised of a solvent for said polymer and a non-solvent for said polymer whereby said membrane exhibits enhanced separative properties in contrast to a membrane having been annealed in an annealing medium which does not comprise a solvent for said polymer.

In accordance with the present invention, there is also provided a process for producing a semipermeable polybenzimidazole membrane which comprises the following steps:

(a) providing a solution of a polybenzimidazole polymer in a solvent capable of dissolving said polymer;

(b) depositing a film of said solution upon a support;

(c) removing an amount of solvent from said film sufficient to result in the formation of a thin solid layer on the exposed surface of said film having a density which is substantially greater than the remaining portion of said film on which said solid layer of increased density is formed;

(d) washing the film with a non-solvent for said polymer to remove residual solvent thereby producing a semipermeable membrane; and (e) annealing said semipermeable membrane while in contact with a non-aqueous annealing medium comprised of a solvent capable of dissolving said polymer and a non-solvent for said polymer.

In accordance with the present invention, there is also provided a process for producing a hollow filament polybenzimidazole membrane by a process which comprises the following steps:

(a) providing a solution of a polybenzimidazole polymer in a solvent capable of dissolving said polymer;

(b) extruding a hollow filament of polybenzimidazole polymer through a concentric jet spinnerette from said solution;

(c) coagulating said hollow filament in a coagulation bath;

(d) removing an amount of solvent from said filament sufficient to result in the formation of a solid layer on the exposed surface of said filament having a density which exceeds that of the remaining portion of said filament on which said solid layer of increased density is formed;

(e) washing the filament with a non-solvent for said polymer to remove residual solvent thereby producing a semipermeable membrane in the form of a hollow filament; and (f) annealing the resulting semipermeable hollow filament membrane while in contact with non-aqueous annealing medium comprised of a solvent for said polymer and a non-solvent for said polymer.

There are also provided membranes produced by the above-described processes.

DETAILED DESCRIPTION OF THE INVENTION

It has been unexpectedly and surprisingly found that the use of a non-aqueous annealing medium which is comprised of a solvent and a non-solvent for the polybenzimidazole polymer permits the annealing step to be accomplished satisfactorily at temperatures significantly below those employed previously whereby a membrane can be produced which possesses greater resistance to dimensional change and cracking, etc. The use of such lower annealing temperatures, in contrast to prior art processes, does not result in a significant decrease in the degree of salt rejection exhibited by the membrane. In addition, the presence of the solvent in the annealing medium enables a desirable salt rejection to be obtained at conventional annealing temperatures in contrast to that obtained at such temperatures when the annealing medium does not include a solvent for the polymer.

A. The Starting Polymer

The polymeric material utilized to form the semipermeable membranes of the present invention is a linear polybenzimidazole. Typical polymers of this class and their preparation are more fully described in U.S. Pat. No. 2,895,948, U.S. Re. Pat. No. 26,065, and in the Journal of Polymer Science, Vol. 50, pages 511–539 (1961) which are herein incorporated by reference. The polybenzimidazoles consist essentially of recurring units of the following Formulas I and II:

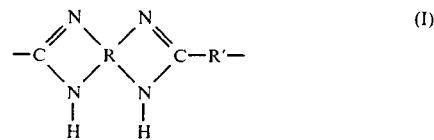

wherein R is a tetravalent aromatic nucleus, preferably symmetrically substituted, with the nitrogen atoms forming the benzimidazole rings being paired upon adjacent carbon atoms, i.e., ortho carbon atoms, of the aromatic nucleus, and R' is a member of the class consisting of (1) an aromatic ring, (2) an alkylene group (preferably those having four to eight carbon atoms), and (3) a heterocyclic ring from the class consisting of (a) pyridine, (b) pyrazine, (c) furan, (d) quinoline, (e) thiophene, and (f) pyran; and

wherein Z is an aromatic nucleus having the nitrogen atoms forming the benzimidazole ring paired upon adjacent carbon atoms of the aromatic nucleus.

Preferably, aromatic polybenzimidazoles are selected, e.g., from polymers consisting essentially of the recurring units of Formulas I and II wherein R' is an aromatic ring or a heterocyclic ring.

As set forth in U.S. Pat. No. Re. 26,065, the aromatic polybenzimidazoles having the recurring units of Formula II may be prepared by self-condensing a trifunctional aromatic compound containing only a single set of ortho-disposed diamino substituents and an aromatic, preferably phenyl, carboxylate ester substituent. Exemplary of polymers of this type is poly-2,5(6)-benzimidazole prepared by the autocondensation of phenyl-3,4-diaminobenzoate.

As also set forth in the above-mentioned patent, the aromatic polybenzimidazoles having the recurring units of Formula I may be prepared by condensing an aromatic tetraamine compound containing a pair of orthodiamino substituents on the aromatic nucleus with a dicarboxyl compound selected from the class consisting of (a) the diphenyl ester of an aromatic dicarboxylic acid, (b) the diphenyl ester of a heterocyclic dicarboxylic acid wherein the carboxyl groups are substituents upon carbon in a ring compound selected from the group consisting of pyridine, pyrazine, furan, quinoline, thiophene and pyran and (c) an anhydride of an aromatic dicarboxylic acid.

Examples of polybenzimidazoles which have the recurring structure of Formula I are as follows:
poly-2,2'(m-phenylene)-5,5'-bibenzimidazole;
poly-2,2'(pyridylene-3",5")-5,5'-bibenzimidazole;
poly-2,2'-(furylene-2",5")-5,5'-bibenzimidazole;
poly-2,2'-(naphthalene-1",6")-5,5'-bibenzimidazole;
poly-2,2'-amylene-5,5'-bibenzimidazole;
poly-2,2'-octamethylene-5,5'-bibenzimidazole;
poly-2,6-(m-phenylene)-diimidazobenzene;
poly-2,2'-cyclohexeneyl-5,5'-bibenzimidazole;
poly-2,2'(m-phenylene)-5,5'-di(benzimidazole) ether;

poly-2,2'(m-phenylene)-5,5'-di(benzimidazole) sulfide;

poly-2,2'(m-phenylene)-5,5'-di(benzimidazole) sulfone;

poly-2,2'(m-phenylene)-5,5'-di(benzimidazole) methane;

poly-2',2"(m-phenylene)-5',5"-di(benzimidazole) ethylene-1,2 where the double bonds of the ethylene groups are intact in the final polymer.

The preferred polybenzimidazole for use in the present process is one prepared from poly-2,2'-(m-phenylene)-5,5'-bibenzimidazole, the recurring unit of which is:

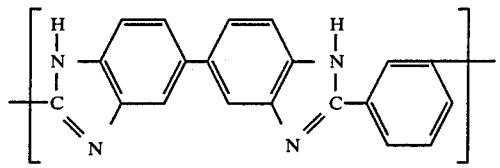

Any polymerization process known to those skilled in the art may be employed to prepare the polybenzimidazole which is utilized to form semipermeable membranes in accordance with the present invention. With respect to aromatic polybenzimidazoles, preferably, equimolar quantities of the monomeric tetraamine and dicarboxyl compound may be introduced into a first step melt polymerization reaction zone and heated therein at a temperature above about 200° C., preferably at least 250° C., and more preferably from about 270° to 300° C. The reaction is conducted in a substantially oxygen-free atmosphere, i.e., below about 20 ppm oxygen and preferably below about 8 ppm oxygen, until a foamed prepolymer is formed. Usually, the first stage reaction is continued until a prepolymer is formed having an inherent viscosity, expressed as deciliters per gram, of at least 0.1, and preferably from about 0.13 to 0.3 (determined from a solution of 0.4 grams of the polymer in 100 milliliters of 97 percent $H_2SO_4$ at 25° C.).

After the conclusion of the first stage reaction, which normally takes at least 0.5 hours and preferably 1 to 3 hours, the foamed prepolymer is cooled and then powdered or pulverized in any convenient manner. The resulting prepolymer powder is then introduced into a second stage polymerization reaction zone wherein it is heated under substantially oxygen-free conditions, as described above, to yield a polybenzimidazole polymer product, desirably having an I.V., as measured above, of at least 0.4., (e.g., 0.8 to 1.1 or more.) When the polybenzimidazole polymer is to be utilized in the form of a hollow fiber, its preferred inherent viscosity is at least about 0.5, most preferably in the range of about 0.7 to about 1.4.

The temperature employed in the second stage is at least 250° C., preferably at least 325° C., and more preferably from about 350° to 425° C. The second stage reaction generally takes at least 0.5 hours, and preferably from about 1 to 4 hours or more. It is, of course, also possible to prepare the instant polymers via a one-step reaction. However, the previously-described two-step process is preferred.

B. The Polymer Solution

The solvents utilized to form the polybenzimidazole polymer solutions include those solvents which are commonly-recognized as being capable of dissolving the particular polybenzimidazole polymer. For instance, the solvents may be selected from those commonly utilized in the formation of polybenzimidazole dry spinning solutions. Illustrative examples of suitable solvents include N,N-dimethyl acetamide, N,N-dimethyl formamide, dimethyl sulfoxide, and N-methyl-2-pyrrolidone. The particularly preferred solvent is N,N-dimethyl acetamide. Additional representative solvents include formic acid, acetic acid, and sulfuric acid.

The polymer solutions may be prepared, for example, by dissolving sufficient polybenzimidazole in the solvent to yield a final solution containing from about 5 to 30 percent by weight of polymer based on the total weight of the solution, and preferably from about 10 to 20 percent by weight.

The quantity of polybenzimidazole dissolved in the solvent should be such that the resulting solution has a viscosity of about 50 to 4,000 poise at 30° C., and preferably about 400 to 600 poise.

One suitable means for dissolving the polymer in the solvent is by mixing the materials at a temperature above the normal boiling point of the solvent, for example, about 25° to 120° C. above such boiling point, and at a pressure of 2 to 15 atmospheres for a period of 1 to 5 hours. The resulting solutions are preferably filtered to remove any undissolved polymer. A minor amount of lithium chloride optionally may be provided in the spinning solution in accordance with the teachings of commonly-assigned U.S. Pat. No. 3,502,606 of Anthony B. Conciatori and Charles L. Smart. The lithium chloride serves the function of preventing the polybenzimidazole polymer from phasing out of the solution upon standing for extended periods of time.

C. Semipermeable Flat Film Membrane Formation

The solution of polybenzimidazole polymer is deposited upon a support to form a wet film of the same. The nature of the support is not critical and may be selected from a variety of materials including ceramic, glass, or metallic plates (e.g., stainless steel). The support is preferably provided with retaining elements, or raised edges, whereby the solution is confined to the surface thereof at the desired location until its consistency is such that retaining elements are no longer needed. Numerous techniques are available for the application of the solution to the support as will be apparent to those skilled in the art. For instance, the polybenzimidazole polymer solution may be simply poured upon a level support in a quantity sufficient for it to assume the desired uniform thickness. A blade optionally may be drawn over the surface of the wet film to aid the deposition of a wet film of uniform thickness. In a preferred embodiment of the invention, the solution is deposited by the utilization of a doctor blade caster.

The thickness of the wet film deposited upon the support is influenced by the desired thickness of the polybenzimidazole semipermeable membrane ultimately to be produced. Generally, the wet film is deposited upon the support in a substantially uniform thickness of about 1 to 30 mils and preferably 2 to 10 mils. In a particularly preferred embodiment of the invention, the wet film is deposited in a thickness of about 4 to 8 mils.

A quantity of solvent is next evaporated from the expose surface of the wet film to allow the formation of a relatively thin solid layer (i.e., a thin porous polymeric film) on the exposed surface of the same. The thin solid film commonly exhibits a thickness of about 0.01 to 20 microns, and preferably about 1 to 10 microns. During the formation of the solid layer on the exposed surface of the film, the solvent present near the surface of the wet film is flashed off and a thin coagulated solid layer or skin of polybenzimidazole polymer remains. The remaining portion of wet film which supports the solid layer remains essentially unchanged while the solid layer is formed. The solid layer accordingly exhibits a density which is substantially greater than that of the remaining portion of the film which has not undergone coagulation and continues to possess a liquid consistency.

The evaporation of solvent from the exposed surface of the wet film may be accomplished by a variety of techniques as will be apparent to those skilled in the art. For instance, a stream of air or other gas at ambient or at an elevated temperature (e.g., approaching the boiling point of the solvent) may be simply directed at the exposed surface of the wet film. Alternatively, the wet film may be simply allowed to stand in an uncirculated gaseous environment wherein the requisite degree of solvent evaporation is accomplished. In a further embodiment of the invention, the gaseous atmosphere to which the wet film is exposed may be at reduced pressure, e.g., 100 mm of Hg up to about atmospheric pressure. It will be apparent to those skilled in the art that the rate at which the solvent is evaporated increases with the temperature of the gaseous atmosphere impinging upon the wet film, the flow rate of the gaseous atmosphere, and with reduced pressure. The time required to form the desired thin solid layer upon the exposed surface of the wet film commonly ranges from about 5 seconds to 30 minutes, and preferably from about 15 seconds to 5 minutes. In a preferred embodiment of the invention the wet film is exposed to a stream of circulating air at ambient temperature (e.g., 25° C.) and pressure for about 1 to 5 minutes. When the air is not circulated, longer exposure times advantageously may be employed.

The resulting film bearing a thin solid layer upon its surface is next converted to a semipermeable membrane suitable for separating components of a solution by washing the same with a non-solvent for the polybenzimidazole polymer which is capable of removing residual quantities of the polybenzimidazole solvent. During the wash step, the remaining polybenzimidazole polymer within the wet film is coagulated while the solvent which originally dissolved the same is removed. The wash medium is preferably aqueous in nature and is most preferably water. The wash step is preferably carried out by immersing the film in the wash medium. Alternatively, any other convenient means for contacting the film with the wash medium may be utilized, such as by spraying the film with the same. In a preferred embodiment of the invention, a water wash medium is provided at a relatively cool temperature, e.g., at about 5° to 30° C., and at a temperature of about 10° to 25° C. in a particularly preferred embodiment. The time required to accomplish coagulation of the remaining polybenzimidazole polymer and the substantially complete removal of residual solvent for the same varies with the temperature of the wash medium. Satisfactory wash times commonly range from about 30 seconds to 20 minutes, and preferably about 2 to 5 minutes. Considerably longer wash times may be employed, but generally with no commensurate advantages.

The resulting flat film membranes formed of the polybenzimidazole polymer consist of an outer relatively thin surface layer formed during the evaporation step adjacent to a relatively thick layer of a more porous structure formed during the wash step. It is believed that the denser relatively thin outer layer is primarily responsible for the ability described hereafter of the resulting membranes to effect the separation of the components of a solution, and that the remaining more porous portion of the membrane provides primarily a supporting function. The membranes are characterized by high thermal stability and can withstand temperatures during use in excess of 125° C. Also, the membranes exhibit a high degree of chemical stability, and can continue to function in spite of contact with wide variety of reagents and solvents.

D. Semipermeable Hollow Filament Membrane Formation

Membranes formed of either a single or a plurality of parallel polybenzimidazole hollow fibers also find utility in the instant invention. These filaments can be prepared by solution spinning using a dope of the polybenzimidazole polymer. Suitable solvents for the preparation of this dope include those solvents which are commonly-recognized as being capable of dissolving the particular polybenzimidazole polymer, such as those solvents used in preparing the polymer solution for film preparation as previously-described. Particularly preferred is a solvent system comprising dimethyl acetamide and lithium chloride.

Using conventional equipment and techniques the dope is placed in an extrusion or spinning bomb at the desired solids content. The amount of extrusion solids, of course, is dependent upon the viscosity and molecular weight of the particular polybenzimidazole polymer used. However, using dimethylacetamide and lithium chloride as a solvent system, solids in the range of about 20 to 30 weight percent are typical. In selecting the amount of solids to be used, it is desirable to use a dope having the highest possible viscosity which can still be extruded at the desired extrusion temperature. Extrusion temperatures generally range from about room termperature or slightly lower to as high as 100° to 150° C.

The bomb containing the spinning dope is attached to the spinnerette and pressurized with sufficient pressure to cause the polymer solution contained in the bomb to escape through the spinnerette jet. It is, of course, understood that in order to prepare optimum hollow filaments the dope placed in the bomb should be filtered either prior to placing it in the bomb or just prior to spinning. The spinnerette or nozzle through which the hollow filaments are spun comprises an inner nozzle and a concentric nozzle arranged about the inner nozzle and is referred to as a concentric hollow jet spinnerette. In order to maintain the hollow configuration of spun fibers a fluid, either gaseous or liquid, is forced through the inner nozzle. Examples of this fluid include nitrogen and ethylene glycol.

As the polybenzimidazole polymer is spun it is fed into a coagulation bath, which bath comprises a solvent or solvent system which is non-solvent for the polybenzimidazole polymer employed and preferably is a solvent for the dope solvent. Though the hollow filament can be spun directly into the coagulation bath, it is preferred to expose the spun fiber to a gas capable of effecting surface coagulation or drying of the fiber. Generally, this can be accomplished by spinning the fiber into air for usually not more than 1 to 10 seconds or in any case no longer than is required to coagulate a thin surface layer on the fiber.

The preferred types of coagulation bath solvents include water, ethylen glycol and mixtures of these two. The speed at which the hollow filament is introduced into the coagulation bath can vary depending upon the length of the bath used. Generally, speeds of about 2 to 50 meters per minute, preferably 5 to 20 meters per minute, are utilized with baths which are from 1 to 10 meters, preferably 1 to 5 meters in length. Thus exposure to the bath should be in the range of about 2 to 10 seconds or longer.

During the coagulation bath treatment step, the hollow filament material is preferably subjected to a drawing operation. The purpose of this drawing operation is to decrease the size of the hollow filament, thereby increasing its surface area per unit volume as well as its strength. Preferably, the spun hollow filament material is drawn at a ratio between 1:1 and 20:1, most preferably between 5:1 and 15:1. The resulting filaments exhibit an inside diameter of about 12 microns to about 500 microns and an outside diameter of 25 microns to about 1000 microns, preferably 25 to 250 microns and 50 to 500 microns respectively.

During any of the above steps the hollow filament when exposed to air should be kept moist so as not to impair the reverse osmosis properties of the filament.

E. The Annealing Treatment

The semipermeable polybenzimidazole membrane, either in its flat film or hollow filament form, is next annealed by contact with a non-aqueous annealing medium which comprises both a solvent and a non-solvent for the polybenzimidazole polymer at a temperature preferably below about 125° C.

As previously noted, it has been unexpectedly and surprisingly found that the use of a non-aqueous annealing medium which is comprised of both a solvent and a non-solvent for the polymer permits the annealing step to be accomplished satisfactorily at temperatures significantly below those employed previously while still obtaining the desired separative properties. For example, it has commonly been the practice previously to employ annealing temperatures in the range of about 120° to 145° C. However, the use of such temperatures can result in disadvantageous mechanical properties in the membrane such as severe dimensional change, brittleness and cracking, etc. However, annealing temperatures below about 125° C., and preferably below about 100° C., can be employed during practice of the present invention by which the above disadvantages can be desirably avoided. For example, annealing temperatures on the order of about 90° C. can be employed with advantage.

In addition, the process of the present invention enables a membrane of enhanced separative properties to be produced without an increase in annealing temperature. That is, the annealing temperature can be maintained at the same value as previously but a membrane of more desirable properties produced due to the presence of the solvent in the annealing medium. Such an advantage enables the annealing temperature to be maintained at acceptable limits while achieving desirable separative property that normally could only be achieved at higher temperatures.

Exemplary non-solvent liquids include polyhydroxy alcohols having two to three hydroxy groups and two to six carbon atoms. Representative polyhydroxy aliphatic alcohols for use in the present invention include glycols such as ethylene glycol (1,2-ethanediol), propylene glycol (1,2-propanediol), trimethylene glycol (1,3-propanediol), alphabutylene glycol (1,2-butanediol), beta-butylene glycol (1,3-butanediol), tetramethylene glycol (1,4-butanediol), diethylene glycol (2,2'-oxydiethanol), triethylene glycol (2,2'-(ethylenedioxy) diethanol), and hexamethylene glycol (1,6-hexanediol). Other polyhydroxy aliphatic alcohols such as glycerol (1,2,3-propanetriol) may likewise be selected. The particularly preferred polyhydroxy aliphatic alcohols are ethylene glycol, glycerol, and 1,3-butylene glycol. Mono- and dialkyl ethers of ethylene glycol marketed under the trademark Cellosolve may also be selected. Known plasticizers for the polymer are also suitable non-solvents for polybenzimidazole for use in the present invention. Water is specifically excluded as a non-solvent for the annealing medium.

It is preferred that the non-solvent and solvent have a boiling point in excess of the temperature at which the annealing step is conducted so that this step may be conveniently carried out at atmospheric pressure. If necessary, however, the annealing step may be conducted under superatmospheric pressure conditions.

Suitable solvents which may be employed in the annealing medium include but are not limited to those previously-identified during the discussion regarding formation of the membrane. The annealing medium comprises a minor portion of the solvent and a major portion of the non-solvent, with the solvent preferably being present in an amount ranging from about 1 to 50 (preferably about 1 to 30) percent by weight and the non-solvent preferably being present in an amount ranging from about 99 to 50 (preferably about 99 to 70) percent by weight, based on the total weight of the annealing medium.

If the membrane is annealed at a temperature in excess of 100° C., the membrane is desirably pretreated prior to the annealing step to remove residual water contained therein so that the water does not vaporize during annealing and undesirably affect the physical properties of the membrane. Such pretreatment is conventionally accomplished by contacting the membrane with a suitable medium such as ethylene glycol which can selectively replace the water. The membrane is generally passed through sequential baths of increasing concentration of ethylene glycol at room temperature (e.g., 25, 50, 75 and 100 percent by weight) for 5 to 10 minutes each until the water in the membrane is removed. The membrane is thereafter annealed as described in the annealing medium. Subsequent to annealing, the membrane is passed back through the baths in reverse order to selectively replace the ethylene glycol with water.

Contact between the semipermeable polybenzimidazole membrane and the annealing medium is preferably accomplished by immersing either the film or the fiber in a bath of the medium. When contact is carried out through immersion, the organic liquid may be heated to the desired temperature prior to immersion, or the liquid may be raised to the desired temperature while in contact with the membrane. Such contact may alternatively be carried out by spraying or other similar techniques as will be apparent to those skilled in the art. It is recommended that the semipermeable membrane be annealed under conditions wherein it is free to shrink. Shrinkages of about 5 to 10 percent in length are commonly observed during the annealing step. It is preferred that the membrane is removed from the support prior to the annealing step.

The period of time during which the annealing step is conducted varies with the temperature of the annealing medium. Generally, satisfactory annealing is conducted during a period of time ranging from about 30 seconds to 20 minutes, and preferably ranging from about 8 to 12 minutes.

The theory whereby the properties of the semipermeably polybenzimidazole membranes are improved through the annealing treatment is considered complex and incapable of simple explanation. It is believed, however, that the microstructure of the membrane contracts to some degree to yield a more uniform configuration. Also, as indicated hereafter, the annealing step results in improved performance during desalination separations.

In preparing the hollow filament fibers of the instant invention, it is important to recognize that the optimum separators or reverse osmosis membranes are prepared from a plurality of parallel hollow fibers which fibers exhibit the minimum possible diameter, for as the diameter of the hollow fibers utilized decreases the surface area available to the reverse osmosis processes necessarily is increased and with it the rate of reverse osmosis. It is further desirable to have the maximum possible inside diameter in order to increase the inside surface area of the reverse osmosis hollow filament membranes. Thus, the optimum hollow filaments would be those of the smallest diameter having the thinnest possible walls. Bundles of the fibers or hollow filaments containing the desired number of fibers may be prepared by applying an adhesive to each end of a group of prearranged parallel fibers. The bundled fibers are then preferably inserted into an elongated fluid-tight tubular casing assembly formed of a suitable material such as steel. Each end of the bundled fibers communicates with the outside of the casing while at either end of the casing a means for sealing each end of the fiber bundle to the ends of the casing is provided. The tubular casing is further provided with valves which open into the interior of the casing and to the outer surface of each of the fibers in the bundle, so as to provide a means for circulating the liquid to be purified about the hollow fibers. Although the fiber bundle should be packed as tightly as possible, it should be packed loosely enough to allow a liquid to pass between the individual fibers and effectively surround each hollow filament. Rather than utilizing a dual-ended tubular casing in which both ends are open to allow the escape of collected fluids, it is possible to utilize a permeator in which hollow filament bundles have been formed into a loop so that the ends of each of the filaments each exit through the same opening in the tubular casing. It is also, of course, possible to employ bundles of hollow fibers as reverse osmosis membranes when one end of the bundle has been blocked off.

In actual operation, water (or other liquid) is pumped into the casing to surround the exterior walls of the fibers in the bundle. The pressure can range from slightly above ambient to about 5,000 psi, preferably 600 to 3,000 psi. In the case of salt water, substantially (as high as 99 percent or higher) salt free water (depending of course on the feed concentration) accumulates on the inside of the fibers and flows in either direction along the hollow filaments to the exit. Using the above procedure, it is possible to prepare as much as 2 to 25 gallons of water or more per square foot of hollow filament membrane outside surface area per day at pressures up to 5,000 psi.

The hollow fibers as prepared above can be assembled for use in water purification or in a permeator as described in U.S. Pat. No. 3,339,341, and as further described in U.S. Pat. No. 3,567,632.

Generally, these permeators comprise in combination a fluid-tight casing assembled about a plurality of substantially parallel hollow fibers prepared from the polybenzimidazole polymers of the instant invention. The casing is provided with an inlet means for directing feed fluid (the fluid upon which the reverse osmosis operation is to act upon) over that portion of the exterior surface of the hollow fibers exposed in the interior of the casing. The casing is also provided with an exit means for selecting and removing a fluid which has been subjected to the reverse osmosis process (in the case of salt water, desalinized water). Of course, the feed fluid may also be directed into the interior of said hollow filaments in which case the fluid which has been subject to reverse osmosis is removed from the exterior surface of said hollow filaments.

When reverse osmosis membrane products or processes are referred to herein, it is of course understood that the liquid mixture or solution which is to be separated may be contacted with either one side or the other of the membranes or alternately with first one side and then the other side of the membrane. In either case on the other side of the membrane from the side of initial contact there is recovered liquid which contains a reduced amount of one component of the mixture of solution.

The resulting membrane formed of polybenzimidazole polymer consists of a outer relatively thin semipermeable surface layer formed during the evaporation step adjacent a relatively thick layer of a more porous structure. It is believed that the denser relatively thin outer layer is primarily responsible for the ability described hereafter of the resulting membranes to effect the separation of the components of a solution, and that the remaining more porous portion of the membrane serves primarily a supporting function. The membranes are characterized by high thermal and dimensional stability and can withstand temperatures during use in excess of 125° C. Also, the membranes exhibit a high degree of chemical stability, and can continue to function in spite of contact with a wide variety of solvents. The membranes also exhibit a reduced tendency to crack as a result of reduced brittleness due to the annealing temperatures employed.

The polybenzimidazole membranes of the present invention, once positioned upon a conventional porous support such as a porous steel plate, or arranged in hollow filament bundles, may be utilized to separate components of a solution by a variety of techniques, such as reverse osmosis, electrodialysis or ultrafiltration. For instance, the membranes of the present invention may be used to good advantage in those areas where cellulose acetate separatory membranes have been used heretofore. However, because of the increased thermal and chemical stability exhibited by the polybenzimidazole membranes, a greater range of operating conditions may be employed. The theory whereby the membranes of the present invention function to selectively isolate components of a solution is considered complex and presently incapable of simple explanation. Representative separations which may be accomplished through the use of the polybenzimidazole membranes are as follows: sodium chloride from aqueous solutions of the same, inorganic or higher molecular weight organic salts and molecules from aqueous solutions of the same, inorganic or low molecular weight organic acids, etc.

The polybenzimidazole membranes of the present invention are particularly suited for use in desalination operations in which the presence of sodium and chloride ions is diminished in aqueous solutions of the same by reverse osmosis. Once positioned on a conventional porous support, the membrane is placed within a conventional reverse osmosis chamber with a solution of lesser salt concentration, e.g., pure water positioned on one side of the membrane and a solution of greater salt concentration on the opposite side. A pressure is exerted on the solution of greater salt concentration which exceeds the natural osmotic pressure and water of a lesser salt concentration is continuously withdrawn on the opposite low pressure side of the membrane. Additional salt water is continuously added to the high pressure side of the membrane and subjected to pressure. In this way, concentrated salt water may be withdrawn and disposed of, continuously or periodically, thereby minimizing the osmotic pressure which must be overcome to effect the separation.

The free energy of the solvent (i.e., water) in an aqueous sodium chloride solution is less than the free energy of the solvent in the pure state. There results, therefore, a spontaneous tendency for the solvent to move from the relatively high free-energy state of the pure solvent to the relatively low free-energy state of the solution. This tendency can be balanced by increasing the free-energy of the solution by subjecting it to an externally applied pressure. Mathematical derivations to determine the quantitative value of the pressure differential can be found in some physical chemistry texts.

The following examples are given as specific illustrations of the invention. It should be understood, however, that the invention is not limited to the specific details set forth in the examples.

EXAMPLE 1

An unannealed membrane was prepared from a dope comprised of 21 percent by weight of polybenzimidazole, 1.33 percent by weight of lithium chloride and 77.67 percent by weight of dimethylacetamide with a 4 mil laydown on a non-woven polyester fabric marketed by Eaton-Dikeman under the trademark Hollytex, line speed of 20 feet/minute, room temperature drying with an air velocity of 1200 feet/minute and coagulation in water at 12° C. The membrane was pretreated sequentially in four baths of ethylene glycol of increasing concentration (25, 50, 75 and 100 percent by weight) at room temperature for 5 to 10 minutes per bath to remove residual water from the membrane.

The membrane was then annealed in a medium comprised of dimethylacetamide and ethylene glycol in varying proportions (by weight) at 120° C. for 10 minutes. The water flux and salt rejection of the membrane was determined at room temperature, 400 psig and 0.5 percent NaCl solution and the results set forth in Table I below:

TABLE I

| | Example 1 Results | | | |
|---|---|---|---|---|
| Sample | DMAc % by wt | Ethylene Glycol % by wt | Water Flux Gals/ft$^2$/day | Salt Rejection % |
| 1[a] | 0 | 100 | 25 | 59 |
| 2[b] | 0 | 100 | 17 | 75 |
| 3[a] | 2.5 | 97.5 | 21 | 79 |
| 4[b] | 2.5 | 97.5 | 14 | 89 |
| 5[a] | 5 | 95 | 15 | 86 |
| 6[b] | 5 | 95 | 10 | 93 |
| 7[a] | 10 | 90 | 14 | 90 |
| 8[b] | 10 | 90 | 9 | 96 |

[a]Run time of 60 minutes.
[b]Run time of 47 minutes.

EXAMPLE 2

A membrane was produced in accordance with the procedure of Example 1 and annealed at varying temperatures for 5 minutes in ethylene glycol with and without dimethylacetamide. The performance of the membrane is determined as in Example 1 and set forth in Table II below:

TABLE II

| | Example 2 Results | | | |
|---|---|---|---|---|
| | Annealing | Medium A | | Medium B |
| Sample | Temperature °C. | Flux | Salt Rejection | Flux | Salt Rejection |
| 9 | 120 | 37.5 | 73.1 | 27.1 | 86.2 |
| 10 | 120 | 36.6 | 69.0 | 26.3 | 86.4 |
| 11 | 125 | 33.6 | 64.4 | 24.7 | 86.7 |
| 12 | 125 | 37.0 | 64.4 | 24.4 | 86.4 |
| 13 | 130 | 27.3 | 81.5 | 20.1 | 87.9 |
| 14 | 130 | 29.7 | 74.1 | 21.1 | 87.2 |
| 15 | 135 | 13.6 | 93.6 | 12.7 | 94.3 |
| 16 | 135 | 11.7 | 92.3 | 13.8 | 91.1 |

Medium A = 100% Ethylene Glycol
Medium B = 97% Ethylene Glycol, 3% DMAc (by weight)

Example 1 demonstrates that the percentage of salt rejection is improved by the addition of dimethylacetamide (a solvent) to the annealing medium comprised of a non-solvent when the annealing temperature remains constant. Example 2 demonstrates that the addition of a solvent to the annealing medium enables the annealing temperature to be reduced without suffering substantial decrease in the percentage of salt rejection in comparison to the decrease in salt rejection which occurs if a solvent is not present in the annealing medium.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

I claim:

1. In a process for the production of a semipermeable polybenzimidazole membrane wherein a film or hollow filament is formed from a solution of a polybenzimidazole polymer and subsequently subjected to an annealing step at elevated temperatures in the presence of an annealing medium, the improvement comprising conducting said annealing step in the presence of a non-aqueous annealing medium at a temperature below about 125° C. comprised of a solvent for said polymer and a non-solvent for said polymer whereby said membrane exhibits enhanced separative properties in contrast to a membrane having been annealed in an annealing medium which does not comprise a solvent for said polymer.

2. The process of claim 1 wherein said polybenzimidazole polymer consists essentially of recurring units of the formula:

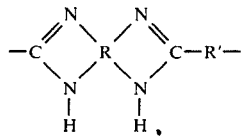

wherein R is a tetravalent aromatic nucleus, with the nitrogen atoms forming the polybenzimidazole rings paired upon adjacent carbon atoms of said aromatic nucleus, and R' is selected from the group consisting of (1) an aromatic ring, (2) an alkylene group having from four to eight carbon atoms, and (3) a heterocyclic ring selected from the group consisting of (a) pyridine, (b) pyrazine, (c) furan, (d) quinoline, (e) thiophene, and (f) pyran.

3. The process of claim 1 wherein said polybenzimidazole polymer is poly-2,2'-(m-phenylene)-5,5'-bibenzimidazole.

4. The process of claim 1 wherein said solvent capable of dissolving said polymer is selected from the group consisting of N,N-dimethyl acetamide, N,N-dimethyl formamide, dimethyl sulfoxide and N-methyl-2-pyrrolidone.

5. The process of claim 1 wherein said solvent is N,N-dimethyl acetamide.

6. The process of claim 1 wherein said annealing step is conducted for a period of time ranging from about 30 seconds to 20 minutes.

7. The process of claim 1 wherein said non-solvent comprises a polyhydroxy aliphatic alcohol having two to three hydroxy groups and two to six carbon atoms.

8. The process of claim 1 wherein said non-solvent comprises ethylene glycol.

9. The process of claim 1 wherein said non-solvent comprises glycerol.

10. The process of claim 1 wherein said non-solvent comprises 1,3-butylene glycol.

11. The process of claim 1 wherein said. annealing step is conducted at a temperature below about 100° C.

12. The process of claim 1 wherein said non-solvent comprises a plasticizer for said polybenzimidazole polymer.

13. The process of claim 1 wherein said annealing medium comprises from about 1 to 50 percent by weight of said solvent and about 99 to 50 percent by weight of said non-solvent.

14. The process of claim 13 wherein said annealing medium comprises from about 1 to 30 percent by weight of said solvent and about 70 to 99 percent by weight of said non-solvent.

15. A semipermeable membrane produced in accordance with the process of claim 1.

16. A process for the production of a semi-permeable polybenzimidazole membrane comprising:
(a) providing a solution of a polybenzimidazole polymer in a solvent capable of dissolving said polymer;
(b) depositing a film of said solution upon a support;
(c) removing an amount of solvent from said film sufficient to result in the formation of a solid layer on the exposed surface of said film having a density which exceeds that of the remaining portion of said film on which said solid layer of increased density is formed;
(d) washing the resulting film with a non-solvent for said polymer to remove residual solvent thereby producing a semipermeable membrane; and
(e) annealing the resulting semipermeable membrane while in contact with a non-aqueous annealing medium at a temperature below about 125° C. comprising a solvent for said polymer and a non-solvent for said polymer.

17. The proces of claim 16 wherein said polybenzimidazole polymer consists essentially of recurring units of the formula:

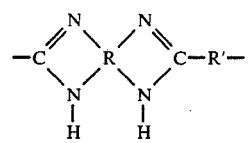

wherein R is a tetravalent aromatic nucleus, with the nitrogen atoms forming the benzimidazole rings paired upon adjacent carbon atoms of said aromatic nucleus, and R' is selected from the group consisting of (1) an aromatic ring, (2) an alkylene group having from four to eight carbon atoms, and (3) a heterocyclic ring selected from the group consisting of (a) pyridine, (b) pyrazine, (c) furan, (d) quinoline, (e) thiophene, and (f) pyran.

18. The process of claim 16 wherein said polybenzimidazole polymer is poly-2,2'-(m-phenylene)-5,5'-bibenzimidazole.

19. The process of claim 16 wherein said solvent for said polymer is selected from the group consisting of N,N-dimethyl acetamide, N,N-dimethyl formamide, dimethyl sulfoxide and N-methyl-2-pyrrolidone.

20. The process of claim 16 wherein said solvent is N,N-dimethyl acetamide.

21. The process of claim 19 wherein said polybenzimidazole polymer is present in said solvent in step (a) in a concentration of about 5 to 30 percent by weight based upon the total weight of the solution.

22. The process of claim 16 wherein said film is deposited on said support in a thickness of about 1 to 30 mils.

23. The process of claim 16 wherein said film is washed with water in step (d) to remove residual solvent and thereby produce a semipermeable membrane.

24. The process of claim 23 wherein said water is employed in step (d) at a temperature of about 5 to 30° C.

25. The process of claim 16 wherein said annealing step is conducted for a period of time ranging from about 30 seconds to 20 minutes.

26. The process of claim 16 wherein said non-solvent comprises a polyhydroxy aliphatic alcohol having two to three hydroxy groups and two to six carbon atoms.

27. The proces of claim 16 wherein said non-solvent comprises ethylene glycol.

28. The process of claim 16 wherein said non-solvent comprises glycerol.

29. The process of claim 16 wherein said non-solvent comprises 1,3-butylene glycol.

30. The process of claim 16 wherein said annealing step is conducted at a temperature below about 100° C.

31. The process of claim 16 wherein said annealing step is conducted under conditions wherein said semipermeable membrane is free to shrink.

32. The process of claim 16 wherein said non-solvent comprises a plasticizer for said polybenzimidazole polymer.

33. The process of claim 16 wherein said annealing medium comprises from about 1 to 50 percent by weight of said solvent and from about 99 to 50 percent by weight of said non-solvent.

34. The process of claim 33 wherein said annealing medium comprises from about 1 to 30 percent by weight of said solvent and from about 70 to 99 percent by weight of said non-solvent.

35. A semipermeable membrane produced in accordance with the process of claim 16.

36. A process for the production of a semi-permeable polybenzimidazole membrane in the form of a hollow filament comprising:
(a) providing a solution of a polybenzimidazole polymer in a solvent capable of dissolving said polymer;
(b) extruding at least one hollow filament through a concentric jet spinnerette from said solution;
(c) coagulating the thus-formed filament in a coagulation bath;
(d) removing an amount of solvent from said filament sufficient to result in the formation of a solid layer on the exposed surface of said filament having a density which exceeds that of the remaining portion of said filament on which said solid layer of increased density is formed;
(e) washing the filament with a non-solvent for said polymer to remove residual solvent thereby producing a semipermeable membrane in the form of a hollow filament; and
(f) annealing the resulting membrane while in contact with a non-aqueous annealing medium comprised of a solvent for said polymer and a non-solvent for said polymer.

37. The process of claim 36 wherein said polybenzimidazole polymer consists essentially of recurring units of the formula:

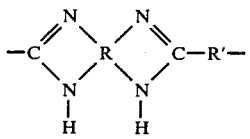

wherein R is a tetravalent aromatic nucleus, with the nitrogen atoms forming the benzimidazole rings paired upon adjacent carbon atoms of said aromatic nucleus, and R' is selected from the group consisting of (1) an aromatic ring, (2) an alkylene group having from four to eight carbon atoms, and (3) a heterocyclic ring selected from the group consisting of (a) pyridine, (b) pyrazine, (c) furan, (d) quinoline, (e) thiophene, and (f) pyran.

38. The process of claim 36 wherein said polybenzimidazole polymer is poly-2,2'(m-phenylene)-5,5'-bibenzimidazole.

39. The process of claim 36 wherein said solvent capable of dissolving said polymer is selected from the group consisting of N,N-dimethyl acetamide, N,N-dimethyl formamide, dimethyl sulfoxide and N-methyl-2-pyrrolidone.

40. The process of claim 39 wherein said solvent is N,N-dimethyl acetamide.

41. The process of claim 39 wherein said polybenzimidazole polymer is present in said solvent in step (a) in a concentration of about 5 to 30 percent by weight based upon the total weight of the solution.

42. The process of claim 36 wherein said film is deposited on said support in a thickness of about 1 to 30 mils.

43. The process of claim 36 wherein said resulting film is washed with water in step (e) to remove residual solvent and thereby produce a semipermeable membrane.

44. The process of claim 43 wherein said water is employed in step (e) at a temperature of about 5 to 30° C.

45. The process of claim 36 wherein said annealing step is conducted for a period of time ranging from about 30 seconds to 20 minutes.

46. The process of claim 36 wherein said non-solvent comprises a polyhydroxy aliphatic alcohol having two to three hydroxy groups and two to six carbon atoms.

47. The process of claim 36 wherein said non-solvent comprises ethylene glycol.

48. The process of claim 36 wherein said non-solvent comprises glycerol.

49. The process of claim 36 wherein said non-solvent comprises 1,3-butylene glycol.

50. The process of claim 36 wherein said annealing step is conducted at a temperature below about 125° C.

51. The process of claim 36 wherein said annealing step is conducted under conditions wherein said semipermeable membrane is free to shrink.

52. The process of claim 36 wherein said non-solvent comprises a plasticizer for said polybenzimidazole polymer.

53. The process of claim 36 wherein said annealing medium comprises from about 1 to 50 percent by weight of said solvent and from about 99 to 50 percent by weight of said non-solvent.

54. The process of claim 53 wherein said annealing medium comprises from about 1 to 30 percent by weight of said solvent and about 70 to 99 percent by weight of said non-solvent.

55. A semipermeable membrane produced in accordance with the process of claim 36.

* * * * *